United States Patent
El-Mankabady

(10) Patent No.: US 10,490,058 B2
(45) Date of Patent: Nov. 26, 2019

(54) INTERNET-OF-THINGS-BASED SAFETY SYSTEM

(71) Applicant: Siemens Industry, Inc., Alpharetta, GA (US)

(72) Inventor: Emad El-Mankabady, Monroe, NJ (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/269,662

(22) Filed: Sep. 19, 2016

(65) Prior Publication Data
US 2018/0082575 A1    Mar. 22, 2018

(51) Int. Cl.
| | |
|---|---|
| G08B 29/02 | (2006.01) |
| H04L 12/26 | (2006.01) |
| H04L 29/08 | (2006.01) |
| H04W 4/70 | (2018.01) |
| H04L 12/24 | (2006.01) |

(52) U.S. Cl.
CPC .............. *G08B 29/02* (2013.01); *H04L 43/10* (2013.01); *H04L 67/12* (2013.01); *H04W 4/70* (2018.02); *H04L 41/0604* (2013.01)

(58) Field of Classification Search
CPC .......... G08B 29/02; H04L 43/10; H04L 67/12
See application file for complete search history.

(56) References Cited

U.S. PATENT DOCUMENTS

| | | | | |
|---|---|---|---|---|
| 5,831,848 A | * | 11/1998 | Rielly | G05B 19/0421 700/3 |
| 6,720,887 B1 | * | 4/2004 | Zunti | G08C 17/02 128/903 |
| 7,461,130 B1 | * | 12/2008 | AbdelAziz | H04W 84/20 709/208 |
| 7,484,008 B1 | * | 1/2009 | Gelvin | G06F 15/173 709/249 |
| 8,214,494 B1 | | 7/2012 | Slavin | |
| 8,289,161 B2 | | 10/2012 | Hosey | |
| 8,548,607 B1 | * | 10/2013 | Belz | G06F 7/00 700/21 |
| 9,119,236 B1 | | 8/2015 | Martin | |
| 9,642,007 B1 | * | 5/2017 | Pesola | H04W 12/06 |
| 2002/0027504 A1 | * | 3/2002 | Davis | G01D 4/004 340/540 |

(Continued)

OTHER PUBLICATIONS

U.S. Appl. No. 14/084,721, filed Nov. 20, 2013, 57 pages.
(Continued)

*Primary Examiner* — Joseph H Feild
*Assistant Examiner* — Rufus C Point

(57) ABSTRACT

Building safety system architecture, methods, and mediums. A method includes receiving substantially-continuous heartbeat communications from a plurality of safety control devices over a packet data network. The method includes monitoring a status of each of the safety control devices. The method includes aggregating the received statuses of the plurality of safety control devices. The method includes transmitting the aggregated statuses to a cloud safety system. The method includes receiving control commands from the cloud safety system. The method includes controlling the safety control devices according to the received control commands.

18 Claims, 3 Drawing Sheets

(56) References Cited

U.S. PATENT DOCUMENTS

| | | | |
|---|---|---|---|
| 2002/0067717 A1* | 6/2002 | Raschke | H04L 12/2803 370/386 |
| 2004/0066313 A1* | 4/2004 | Ong | G08C 19/04 340/870.11 |
| 2004/0236443 A1* | 11/2004 | Ware | G05B 19/0421 700/90 |
| 2005/0001720 A1* | 1/2005 | Mason | G01C 21/206 340/539.13 |
| 2006/0053216 A1* | 3/2006 | Deokar | G06F 21/6218 709/223 |
| 2006/0256712 A1* | 11/2006 | Imajuku | H04J 14/0284 370/218 |
| 2008/0046400 A1* | 2/2008 | Shi | H04L 67/1008 |
| 2009/0216345 A1* | 8/2009 | Christfort | G05B 19/0428 700/21 |
| 2009/0279516 A1* | 11/2009 | Kok | H04M 3/12 370/338 |
| 2009/0286484 A1 | 11/2009 | Phung et al. | |
| 2010/0238798 A1* | 9/2010 | Ahuja | H04L 41/0681 370/225 |
| 2010/0281312 A1* | 11/2010 | Cohn | G08B 29/02 714/49 |
| 2010/0296496 A1* | 11/2010 | Sinha | H04W 12/12 370/338 |
| 2012/0136924 A1* | 5/2012 | Tomida | H04W 4/025 709/203 |
| 2012/0188072 A1* | 7/2012 | Dawes | G06Q 50/06 340/514 |
| 2013/0053988 A1* | 2/2013 | Lin | G05B 15/02 700/83 |
| 2013/0321161 A1 | 12/2013 | Chen | |
| 2014/0143060 A1* | 5/2014 | Fernandez | H04W 4/70 705/14.58 |
| 2015/0142898 A1 | 5/2015 | Piccolo, III | |
| 2015/0288604 A1 | 10/2015 | Boudreaux | |
| 2015/0319226 A1* | 11/2015 | Mahmood | H04L 43/0817 709/201 |
| 2015/0347792 A1* | 12/2015 | Bucherer-Klingler | G06K 7/10297 340/10.1 |
| 2015/0355811 A1* | 12/2015 | Ybanez Zepeda | G06F 3/017 715/810 |
| 2015/0379765 A1* | 12/2015 | Gallo | G06T 17/05 340/525 |
| 2015/0382084 A1* | 12/2015 | Gallo | H04Q 9/00 340/870.01 |
| 2016/0315832 A1* | 10/2016 | Hu | H04L 25/20 |
| 2016/0340856 A1* | 11/2016 | Conner | E02D 31/10 |
| 2017/0124842 A1* | 5/2017 | Sinha | G05B 19/048 |
| 2017/0329292 A1* | 11/2017 | Piaskowski | H04L 12/2809 |

OTHER PUBLICATIONS

Biron, J., et al., "The Edge of the IoT," O'Reilly Media Inc., Apr. 13, 2016, 19 pages.

PCT International Search Report and Written Opinion of International Searching Authority dated Oct. 11, 2017 corresponding to PCT International Application No. PCT/US2017/047717 filed Aug. 21, 2017, pp. 1-10.

\* cited by examiner

INTERNET-OF-THINGS-BASED SAFETY SYSTEM

TECHNICAL FIELD

The present disclosure is directed, in general, to building safety systems, including fire safety system.

BACKGROUND OF THE DISCLOSURE

Typical building safety systems use fire safety systems build around a Fire Alarm Control Panel (FACP) architecture. A conventional FACP employs one or more circuits, connected to sensors (initiating devices) wired in series or parallel "loop" circuits. These sensors are devised to dramatically decrease the circuit resistance when the environmental influence on any sensor exceeds a predetermined threshold. In a conventional fire alarm system, the information density is limited to the number of such circuits used. To facilitate location and control of fire within a building, the structure is subdivided into definite areas or zones. Floors of a multistory building are one type of zone boundary.

Such a conventional system gives limited control or visibility into individual sensors. Improved building safety systems are desirable.

SUMMARY OF THE DISCLOSURE

Various disclosed embodiments relate to systems and methods for building safety.

A method includes receiving substantially-continuous heartbeat communications from a plurality of safety control devices over a packet data network. The method includes monitoring a status of each of the safety control devices. The method includes aggregating the received statuses of the plurality of safety control devices. The method includes transmitting the aggregated statuses to a cloud safety system. The method includes receiving control commands from the cloud safety system. The method includes controlling the safety control devices according to the received control commands.

A building safety system architecture includes a plurality of safety control devices and a safety control gateway in communication with the plurality of safety control devices. The safety control gateway is configured to receive substantially-continuous heartbeat communications from a plurality of safety control devices over a packet data network. The safety control gateway is configured to monitor a status of each of the safety control devices. The safety control gateway is configured to aggregate the received statuses of the plurality of safety control devices. The safety control gateway is configured to transmit the aggregated statuses to a cloud safety system. The safety control gateway is configured to receive control commands from the cloud safety system. The safety control gateway is configured to control the safety control devices according to the received control commands.

In various embodiments, the safety control gateway is also configured to independently control the safety control devices, according to an internal configuration of the safety control gateway, when the safety control gateway is not in communication with the cloud safety system. In various embodiments, each heartbeat communication comprises a data packet that identifies one of the plurality of safety control devices by including a specific unique device identifier for that safety control device. In various embodiments, the heartbeat communications are received from each safety control device once per second. In various embodiments, the heartbeat communications each comprise a data packet received from a respective safety control device, where the data packet includes the status of the respective safety control device and identifies the respective safety control device. In various embodiments, the safety control gateway is also connected to communicate with and control a heating, ventilating, and air conditioning system or a building control system. In various embodiments, the safety control gateway is also connected to a redundant system that can operate redundantly of the cloud safety control system. In various embodiments, monitoring a status of each of the safety control devices also includes detecting if the heartbeat communications fail to be received from one or more of the safety control devices. In various embodiments, when the monitored status of any safety control device includes a status indicating an alarm condition, the status indicating the alarm condition is immediately transmitted to the cloud safety system without being aggregated. In various embodiments, the cloud safety system performs monitoring and data analytic functions on the aggregated statuses.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
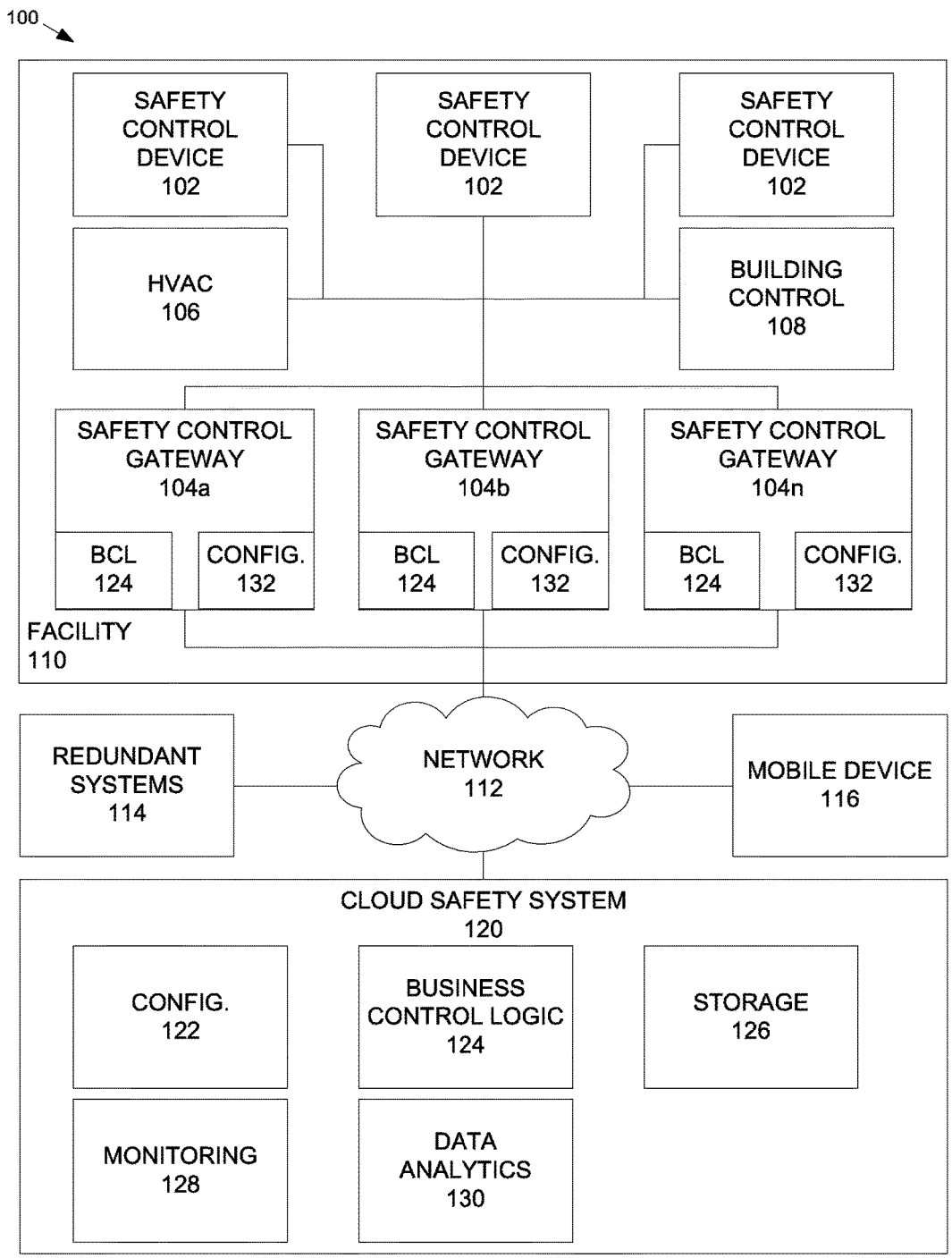
FIG. 1 illustrates a block diagram of a building safety system architecture 00 in which various embodiments are implemented.
Figure 2:
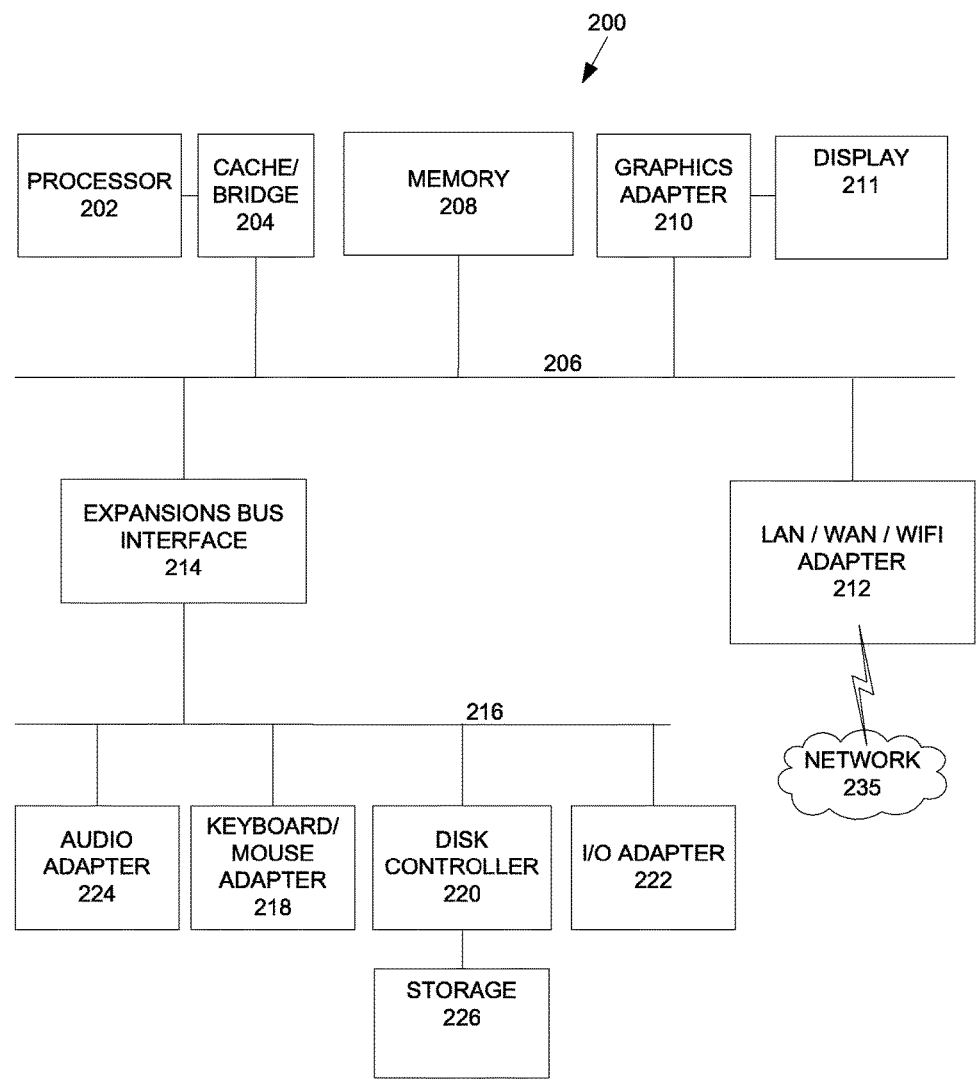
FIG. 2 depicts a block diagram of a data processing system 200 in which various embodiments are implemented.
Figure 3:
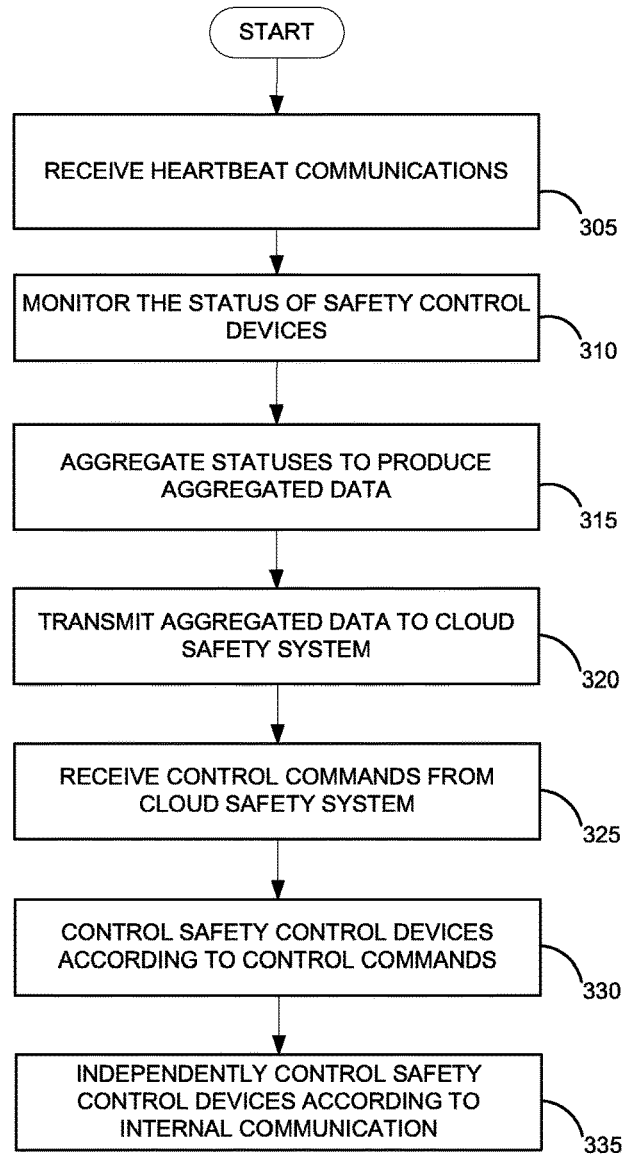
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure include systems and methods for building safety systems that incorporate independently-addressable, networked sensors and actuators with local monitoring and cloud-based management.

In some systems, FACPs and their controlled devices and peripherals are very tightly coupled, which makes the FACP a single point of failure.

Disclosed embodiments migrate functions of a conventional FACP to a networked fire control gateway that can communicate with and be controlled by cloud native applications running on a private cloud network. Disclosed embodiments improve safety system availability and durability by using cloud design, redundancy, and load balancing, which also improves scalability and elasticity over the traditional FACP.

Disclosed embodiments can incorporated sensors, actuators, and other systems that are not typically included in a building safety system, such as HVAC systems, lighting systems, and other systems, so that control and monitoring can be coordinated, and so that emergency response protocols can includes these other devices and systems.

FIG. 1 illustrates a block diagram of a building safety system architecture 100 in which various embodiments are implemented. In this illustrative embodiment, the building safety system architecture 100 includes various devices deployed within or in association with a facility 110. These include a plurality of safety control devices 102. Each of the safety control devices 102 can be a sensor, actuator, or other device configured to communicate with or provide input to one or more safety control gateways 104a-104n. For example, a safety control device 102 can be a smoke sensor, a heat sensor, a pull station, or other sensor or input device. As another example, safety control device 102 can be a siren, warning light, fire sprinkler, loudspeaker, emergency light, or other device configured to communicate with or activate in response to safety control gateways 104a-104n. In other examples, a safety control device 102 can generally represent any controllable device as described herein, including lights, fans, doors, locks, thermostats, and other devices.

Each safety control device 102 communicates via wired or wireless network protocols with safety control gateways 104a-104n. In particular, some or all of safety control devices 102 do not operate "in the loop" as in conventional systems, but each communicates independently with safety control gateways 104a-104n using network protocols, including such protocols as standard IP or BACnet communications. These communications can be via standard network devices and wiring, such as including access points, switches, network meshes, and other such network devices and tools.

HVAC system 106 and building control system 108 are examples of other building management systems that can communicate with safety control gateways 104a-104n, as described in more detail below.

Each safety control gateway 104a-104n is connected to communicate with network 112, which can be any combination of public or private networks, including the Internet. Each safety control gateway is implemented as one or more date processing systems, and can generally perform building safety and control functions as were previously performed by conventional FACPs using "in the loop" hardwired connections.

Safety control gateways 104a-104n can be configured to act cooperatively with each other, and together perform the functions of a unified safety control gateway. In particular, each safety control gateway 104a-104n can normally communicate with and control a different subset of devices as described herein. Each safety control gateway 104a-104n can also monitor the status of the other safety control gateways, and in the event of the failure of one of the safety control gateways, the remaining operational safety control gateways can automatically assume the "responsibilities" of the failed safety control gateway, thus providing redundant monitoring and control of all devices in the building safety system architecture.

References below to the "building safety system 104" will be understood to refer to the combined operations and configurations of one or more of the safety control gateways 104a-104n.

Each safety control gateway 104a-104n includes an internal configuration 132 that includes logic, business rules, and configuration information for monitoring the safety control devices, aggregating status data, communicating with the cloud safety system, and performing functions according to control commands received from the cloud safety system. Further, each safety control gateway 104a-104n includes business control logic (BCL) 124, which includes that logic, business rules, and configuration information for independently performing any required FACP functions if communication with the cloud safety system is lost. For example internal configuration 132 can direct safety control gateway 104 to activate an alarm response according to the received status of the safety control devices and the internal configuration.

In disclosed embodiments, each of the safety control devices that acts as a sensor is configured to remain in substantially constant communication with safety control gateway 104, such as by sending a "heartbeat" communication once a second or some other suitable interval. The heartbeat communication can be implemented as or transmitted with other status communications, such as a regular transmission that indicates that the status is normal or OK, or a regular transmission that indicates some status data, such as the current temperature sensed in a room or otherwise. Safety control gateway 104 listens for each of these communications from each sensor device, and can detect if a device fails to transmit such a signal. "Status" of the device is used generically herein, to describe its state, condition, configuration, or other information as appropriate. For example, if the safety control gateway does not receive a heartbeat communication from a specific safety control device 102 for a given amount of time, such as 10 seconds, safety control gateway can generate a notification of a potential problem or perform some other corrective action.

The safety control devices 102 can send alarm signals or other transmissions indicating an alarm condition. These communications replace hardwired "loop" circuits, so that the failure or activation of a single device is easily and immediately detected and diagnosed, rather than the system merely detecting that some non-specific device in the loop has failed, alarmed, or malfunctioned.

Similarly, each of the safety control devices that does not act as a sensor can also send periodic heartbeat or status communications, but these are not necessarily as frequent as those from sensor devices.

Safety control gateway 104 communicates via network 112 with cloud safety system 120. Cloud safety system 120 includes any number of server data processing systems that together perform functions as described herein. For example, cloud safety system includes functional modules such as configuration 112, business control logic 124, storage 126, monitoring 128, and data analytics 130. Each of these functional modules are executed by one or more processors of the cloud safety system 120, and the processing can be distributed among several servers or processors.

External redundant systems 114 and mobile device 116 can also communicate with cloud safety system 120 or safety control gateway 104 via network 112.

During normal operation, safety control gateway 104 performs safety and fire control functions, including continuously monitoring the status of safety control devices 102, and can do so in conjunction with cloud safety system 120 as described herein. In addition, in some embodiments, safety control gateway 104 can monitor and manage HVAC 106 and building control 108.

The network traffic generated by the heartbeat communications and other status communications can be substantial, so they are, in normal operation, preferably limited to local-network communications with safety control gateway 104. Safety control gateway 104 can then maintain communications with cloud safety system 120. Safety control gateway 104 sends status information, state changes, and other data to cloud safety system 120. Safety control gateway 104 performs data aggregation for data sent by the connected devices and systems and can send aggregated data to cloud safety system 120.

For example, while safety control gateway 104 receives heartbeat communications continuously, safety control gateway 104 does not need to forward these heartbeat communications the cloud safety system 120. Instead, for example, such information as state/status changes of each of the safety control devices 102 or the safety control system as a whole may be sent to the cloud safety system 120. Similarly, control functions performed by cloud safety system 120 can be sent as instructions or configurations to the safety control gateway 104, and safety control gateway 104 can thereafter send any configuration changes to any corresponding safety control device 102.

Cloud safety system 120 can use configuration 112 to maintain, control, and update the configuration of safety control gateway 104. The configuration 112 can be viewed, updated, or otherwise changed by a user of cloud safety system 120 or by a user of mobile device 116 in communication with cloud safety system 120.

Storage 126 can store instructions, logs, and events for cloud safety system 120, safety control gateway 104, or any of the devices or systems connected to safety control gateway 104.

Monitoring 128 monitors the status and operation of safety control gateway 104 or any of the devices or systems connected to safety control gateway 104, based on data sent to cloud safety system 120 from safety control gateway 104.

Data analytics 130 analyzes the history, status, and operation of safety control gateway 104 or any of the devices or systems connected to safety control gateway 104, based on data sent to cloud safety system 120 from safety control gateway 104, and can predict future trends based on this data.

Business control logic 124 can control monitoring and operation of safety control gateway 104 or any of the devices or systems connected to safety control gateway 104, based on data sent to cloud safety system 120 from safety control gateway 104, and can be substantially the same as business control logic 124 found on each safety control gateway 104a-104n. While connected, cloud safety system, by business control logic 124, can monitor and control each of the devices or systems connected to safety control gateway 104, including managing FACP functions, offloading some or all of the processing from safety control gateway 104. To accomplish this, cloud safety system 120 sends control commands to the safety control gateway 104 according to business control logic 124.

According to disclosed embodiments, during normal operation, safety control gateway 104 monitors the local heartbeat communications and the immediate operation and status of safety control devices 102, and forwards aggregated status information from the safety control to cloud safety system 120. Cloud safety system 120 directs FACP functions and other functions according to business control logic 124 by sending control commands to the safety control gateway 104. In some embodiments, cloud safety system 120 also directs functions of heating, ventilating, and air conditioning system (HVAC) 106 or building control 108.

It is important that a building safety system is always online and is not susceptible to Internet connectivity failures. For this reason, when safety control gateway 104 detects that its communication with cloud safety system 120 over network 112 is interrupted, safety control gateway 104 independently controls FACP functions and other functions that may normally be handled by cloud safety system 120 so that building safety functions are always maintained.

Further, redundant systems can include cloud safety systems that are configured to operate redundantly of cloud safety system 120. In this way, to the extent that the greater processing power of a cloud-based system is required, if cloud safety system 120 is unavailable, then external redundant system 114 can perform its functions.

One advantage of having HVAC 106 or building control 108 also connected to and controllable by safety control gateway 104 (and, indirectly, cloud safety system 120) is that HVAC or building control functions can be coordinated with FACP functions. For example, in the event of smoke being detected in some part of facility 110, in addition to operating safety control devices 102 to sound alarms, activate strobes, or perform other alarm response, the HVAC system can be controlled to turn off ventilation, exhaust the smoke to the outdoors, or perform other appropriate functions. Similarly, in such an event, building control systems can be controlled to lock or unlock doors as appropriate to ensure both security and safe exit of occupants, operate lighting, or perform other appropriate functions.

FIG. 2 depicts a block diagram of a data processing system 200 in which various embodiments are implemented. The data processing system 200 is an example of a system that can be used to implement a safety control gateway 104, a cloud safety system 120, external redundant systems 114, mobile device 116, or other devices or systems as described herein. The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi or Bluetooth) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement virtual demand auditing of one or more devices in a building.

LAN/WAN/Wireless adapter 212 may be connected to a network 235, such as for example, communicating between the systems, nodes, servers, or other devices described herein. As further explained below, the network 235 may be any public or private data processing system network or combination of networks, as known to those of skill in the art, including the Internet. Data processing system 200 may communicate over network 235 to one or more computers, which are also not part of data processing system 200, but may be implemented, for example, as a separate data processing system 200, and can implement any of the other systems discussed herein.

FIG. 3 depicts a flowchart of a process in accordance with disclosed embodiments. This process may be performed, for example, by a safety control gateway 104 or a similar system that performs building safety functions as described herein, any of which, or any combination of which, are referred to in the singular as "the local system." The process may be implemented by executable instructions stored in a non-transitory computer-readable medium that cause one or more elements of the system to perform such a process.

The system receives substantially-continuous heartbeat communications from a plurality of safety control devices over a wired or wireless packet data network (305). The heartbeat communications are received from each safety control device at frequent regular intervals, for example once per second. The heartbeat communications can comprise a series of data packets received from each safety control device, where the data packet can include a status of the respective safety control device and identifies the respective safety control device. A data packet can identify a safety control device by including a specific unique device identifier for that safety control device, or can identify the safety control device by including or being sent from a network address associated with that safety control device. Even if a status of the respective safety control device is not included in a packet as an express indication, the receipt of the packet can be considered a status in itself.

The system monitors the status of each of the safety control devices (310). Monitoring the status includes detecting if heartbeat communications fail to be received.

The system aggregates the status of the plurality of safety control devices to produce aggregated data (315).

The system transmits the aggregated data to a cloud safety system (320). This step can include also transmitting the aggregated data to a redundant system. If the monitored status of any safety control device includes a status indicating an alarm condition, the status indicating the alarm condition can be immediately transmitted to the cloud safety system without being aggregated.

The system receives control commands from the cloud safety system (325).

The system controls the safety control devices according to the received control commands (330). This can include, when the system is in communication with the cloud safety system, activating an alarm response according to control commands received from the cloud safety system.

The system independently controls the safety control devices, according to an internal configuration, when the system is not in communication with the cloud safety system (335). This can include activating an alarm response according to the received status of the safety control devices and the internal configuration. This can be very important so that the system is not dependent on cloud safety system, and even if network connectivity is lost with the cloud safety system, the safety control gateway system can immediately assume control for all needed FACP or alarming functions.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method performed by a first safety control gateway in communication with a plurality of safety control devices, comprising:
    receiving substantially-continuous heartbeat communications from a plurality of safety control devices over a packet data network, wherein the heartbeat communications are received from each safety control device at frequent regular intervals;
    monitoring a status of each of the safety control devices;
    aggregating the received statuses of the plurality of safety control devices;
    transmitting the aggregated statuses to a cloud safety system;
    receiving control commands from the cloud safety system; and
    controlling the safety control devices according to the received control commands,
    wherein the first safety control gateway performs safety and fire control functions, the first safety control gateway comprising internal configuration for performing the safety and fire control functions according to the control commands received from the cloud safety system, and business control logic for independently performing the safety and fire control functions according to the received statuses of the plurality of safety control devices when communication with the cloud safety system is lost,
    wherein the first safety control gateway is connected to a second safety control gateway, the first and second safety control gateways monitoring a status of each other, wherein in an event of a failure of the first safety control gateway, the second safety control gateway automatically assumes responsibilities of the first safety control gateway, and in an event of a failure of the second safety control gateway, the first safety control gateway automatically assumes responsibilities of the second safety control gateway, and
    wherein the first safety control gateway is also connected to communicate with and control a heating, ventilating and air conditioning system (HVAC), wherein controlling the safety control devices is coordinated with HVAC functions.

2. The method of claim 1, wherein each heartbeat communication comprises a data packet that identifies one of the plurality of safety control devices by including a specific unique device identifier for that safety control device.

3. The method of claim 1, wherein the heartbeat communications are received from each safety control device once per second.

4. The method of claim 1, wherein the heartbeat communications each comprise a data packet received from a respective safety control device, where the data packet includes the status of the respective safety control device and identifies the respective safety control device.

5. The method of claim 1, wherein the first safety control gateway is also connected to communicate with and control a building control system.

6. The method of claim 1, wherein the first safety control gateway is also connected to a redundant system that can operate redundantly of the cloud safety control system.

7. The method of claim 1, wherein monitoring a status of each of the safety control devices also includes detecting if the heartbeat communications fail to be received from one or more of the safety control devices.

8. The method of claim 1, wherein when the monitored status of any safety control device includes a status indicating an alarm condition, the status indicating the alarm condition is immediately transmitted to the cloud safety system without being aggregated.

9. The method of claim 1, wherein the cloud safety system performs monitoring and data analytic functions on the aggregated statuses.

10. A building safety system architecture, comprising:
    a plurality of safety control devices; and
    a first safety control gateway in communication with the plurality of safety control devices, wherein the first safety control gateway is configured to:
        receive substantially-continuous heartbeat communications from a plurality of safety control devices over a packet data network, wherein the heartbeat communications are received from each safety control device at frequent regular intervals;
        monitor a status of each of the safety control devices;
        aggregate the received statuses of the plurality of safety control devices;
        transmit the aggregated statuses to a cloud safety system;
        receive control commands from the cloud safety system; and
        control the safety control devices according to the received control commands,
    wherein the first safety control gateway performs safety and fire control functions, the first safety control gateway comprising internal configuration for performing the safety and fire control functions according to the control commands received from the cloud safety system, and business control logic for independently performing the safety and fire control functions according to the received statuses of the plurality of safety control devices when communication with the cloud safety system is lost,
    wherein the first safety control gateway is connected to a second safety control gateway, the first and second safety control gateways monitoring a status of each other, wherein in an event of a failure of the first safety control gateway, the second safety control gateway automatically assumes responsibilities of the first safety control gateway, and in an event of a failure of the second safety control gateway, the first safety control gateway automatically assumes responsibilities of the second safety control gateway, and wherein the at least one safety control gateway is also connected to communicate with and control a heating, ventilating and air conditioning system (HVAC), wherein controlling the safety control devices is coordinated with HVAC functions.

11. The building safety system architecture of claim 10, wherein each heartbeat communication comprises a data packet that identifies one of the plurality of safety control devices by including a specific unique device identifier for that safety control device.

12. The building safety system architecture of claim 10, wherein the heartbeat communications are received from each safety control device once per second.

13. The building safety system architecture of claim 10, wherein the heartbeat communications each comprise a data packet received from a respective safety control device, where the data packet includes the status of the respective safety control device and identifies the respective safety control device.

14. The building safety system architecture of claim 10, wherein the first safety control gateway is also connected to communicate with and control a building control system.

15. The building safety system architecture of claim 10, wherein the first safety control gateway is also connected to a redundant system that can operate redundantly of the cloud safety control system.

16. The building safety system architecture of claim 10, wherein monitoring a status of each of the safety control devices also includes detecting if the heartbeat communications fail to be received from one or more of the safety control devices.

17. The building safety system architecture of claim 10, wherein when the monitored status of any safety control device includes a status indicating an alarm condition, the status indicating the alarm condition is immediately transmitted to the cloud safety system without being aggregated.

18. The building safety system architecture of claim 10, wherein the cloud safety system performs monitoring and data analytic functions on the aggregated statuses.

* * * * *